United States Patent
Liu

(10) Patent No.: US 7,376,394 B2
(45) Date of Patent: May 20, 2008

(54) METHOD AND SYSTEM FOR WIRELESS COMMUNICATIONS USING ANTI-INTERFERENCE TO INCREASE DATA TRANSMISSION RATE

(76) Inventor: Ruey-Wen Liu, 1929 Dorwood Drove, South Bend, IN (US) 46617

( * ) Notice: Subject to any disclaimer, the term of this patent is extended or adjusted under 35 U.S.C. 154(b) by 392 days.

(21) Appl. No.: 11/002,161

(22) Filed: Dec. 2, 2004

(65) Prior Publication Data
US 2005/0122920 A1    Jun. 9, 2005

Related U.S. Application Data

(60) Provisional application No. 60/526,512, filed on Dec. 3, 2003.

(51) Int. Cl.
*H04B 1/00*    (2006.01)
(52) U.S. Cl. .................. 455/63.1; 455/67.13; 375/346; 375/350
(58) Field of Classification Search ......... 455/63.1–65, 455/67.13; 375/144, 148, 346–350; 370/335, 370/342, 441, 479
See application file for complete search history.

(56) References Cited

U.S. PATENT DOCUMENTS

| 7,106,801 | B1 | 9/2006 | Guruprasad | |
| 7,155,165 | B1 * | 12/2006 | Kowalewki | .................. 455/65 |
| 2002/0048286 | A1 * | 4/2002 | Brunel | ....................... 370/516 |

OTHER PUBLICATIONS

Oppenheim, A.V., et al., Discrete-Time Signal Processing, Chapter 7; 7.4—"Design of Fir Filters by Windowing", pp. 444-474, Prentice Hall, Inc. 1989.

Vaidyanathan, P.P., Multirate Systems and Filter Banks, Part 3; 11.3—"The Wavelet Transform", pp. 481-500; Prentic Hall, Inc. 1993.

Proakis, J.G., *Digital Communications*, Chapter 12;12-2-2—"Some Applications of DS Spread Spectrum Signals", pp. 712-415; McGraw Hill, Inc., 1995.

Chevreuil, A., et al., "Blind Equalization in the Presence of Jammers and Unknown Noise; Solutions Based on Second-Order Cyclostationary Statistics", *IEEE Trans. on Signal Processing*, pp. 259-263, vol. 46, No. 1, (Jan. 1998).

(Continued)

*Primary Examiner*—Edward F. Urban
*Assistant Examiner*—Raymond S. Dean
(74) *Attorney, Agent, or Firm*—Leydig, Voit & Mayer, Ltd.

(57) ABSTRACT

A method and system for wireless communications between a sender and a receiver enables effective blocking of interference signals by other senders and improving the channel capacity. The receiver uses two or more receiving devices, such as antennas or smart antennas, to receive multiple wireless input signals. By performing a noise-transparent autocorrelation matching analysis on the multiple input signals, the receiver derives an anti-interference filter for interference-blocking action, without the need for information of the interfering vector. The information derived by the receiver may be further used to control the reception by the receiving devices of the receiver, or transmitted to the sender to control its transmission, such that the signal vector may be set to be parallel to the obtained filtering vector to achieve an enhanced channel capacity that may exceed the limit imposed by the well-known Shannon channel capacity of the original channel.

17 Claims, 7 Drawing Sheets

OTHER PUBLICATIONS

Belouchrani A., et al., A Two-Sensor Array Blind Beamformer for Direct Sequence Spread Spectrum Communications; *IEEE Trans on Signal Processing*, pp. 2191-2199, vol. 47, No. 8 (Aug. 1999).

Liu, R., et al., "Autocorrelation-A New Differentiation Factor for Random Multiple Access Wireless Communication", *Proc. ISCAS*, vol. III, pp. 643-646, Phoenix, AZ (May 2002).

Winters J.H., ;Optimal Combining In Digital Mobile Radio with Cochannel Interference, *IEEE J. Sel. Areas Communication*, vol. 2, No. 4., pp. 528-539 (Jul. 1984).

Viterbi, A.J. et al., "CDMA: Principle of Spread Spectrum Communication, Chapter 6; 6.1 Capacity, Coverage, and Control of Spread Spectrum Multiple Access Networks", pp. 179-180; *Addison-Wesley Longman, Inc.* (1995).

Proakis, John G., "Digital Communications", 4th Edition, Chapter 15, "Multiuser Communications" McGraw-Hill, pp. 896-899, 2001.

Luo, Hui et al., "Blind Equalization for MIMO FIR Channels Based Only on Second Order Statistics by Use of Pre-Filters", *In Proc. of IEEE Workshop on Signal Processing Advances in Wireless Communications*, Annapolis, MD, USA, pp. 106-109, 1999.

Luo, Hui et al., "The Autocorrelation Matching Method for Distributed MIMO Communications over Unknown FIR Channels", *In Proc. of ICASSP*, Salt Lake City, UT, USA, pp. 2161-2164, 2001.

Xavier, João M.F., et al., "Closed-form Blind Channel Identification and Source Separation in SDMA Systems Through Correlative Coding", *IEEE Journal on Selected Areas in Communications*, vol. 16, No. 8, pp. 1506-1517, 1998.

Lindgren, Ulf, AI. et al., "Source Separation Using A Criterion Based on Second-Order Statistics", *IEEE Trans, on Signal Processing*, vol. 46, No. 7, pp. 1837-1850, 1998.

Hua, Yingbo, "Blind Identification and Equalization of Channels Driven by Colored Signals", *Signal Processing Advances in Wireless & Mobile Communications*, vol. i, Chapter 4, pp. 113-137, Prentice Hall, 2001.

Liu, Rueywen, et al., "Multi-User Blind Channel Equalization and Signal Discrimination by NIA Matched Filters", *in Proc. of IEEE CAS Notre. Dame Workshop on Wireless Communications and Networking*, Notre Dame, IN, pp. 1-4, Aug., 2001.

Scaglione, A., et al., "Linear Preceding for Estimation and Equalization of Frequency-Selective Channels", *Signal Processing Advances in Wireless & Mobile Communications*, vol. 1, Chapter 9, pp. 291-337, Prentice Hall, 2001.

Tarokh, Vahid, et al., "Space-Time Block Codes from Orthogonal Designs," *IEEE Trans. on Information Theory*, vol. 45, No. 5, pp. 1456-1467, Jul. 1999.

Luo, Hui, et al., "Apply Autocorrelation Matching Method to Outdoor Wireless LAN on Co-Channel Interference Suppression and Channel Equalization", *in Proc. of Wireless Communications Networks Conference*, Orlando, FL, pp. 459-464, Mar. 17-21, 2002.

Sonh, Liang, et al., "A New Multiple-Access Scheme Based on the Diversity of Autocorrelation", *IEEE ICC 2003 International Conference on Communication*, pp. 720-724.

Foschini, G. J., et al., "On Limits of Wireless Communication in a Fading Environment when Using Multiple Antennas", *Wireless Personal Communication*, 6, pp. 311-335,1998.

Massey, J.K.,et al., "Inverses of Linear Sequential Circuits," *IEEE Trans. on Computers*, vol. C-17, No. 4, pp. 330-337, Apr. 1968.

Inouyee, Yujiro, et al., "A System-Theoretic Foundation for Blind Equalization of FIR MIMO Channel Systems," *IEEE Transactions on Circuits and Systems-1, Fundamental Theory and Applications*, vol. 49, No. 4, pp. 425-436, Apr. 2002.

Liu, Ruey-wen, et al., "Direct Blind Deconvolution of Multiuser-Mutlichannel Systems", *11 Int. Symp. on Circuits and Systems*, Orlando, FL, pp. V-49-V-52, May 30-Jun. 2, 1999.

Kailath, Thomas "Linear Systems", Prentice-Hall, Sec. 6.3, pp. 389-395, 1980.

Gorokhov, Alexei, et al., "Subspace-Based Techniques for Blind Separation of Convolutive Mixtures with Temporally Correlated Source," *IEEE Trans. On Circuits and Systems-1, Fundamental Theory and Applications*, vol. 44, No. 9, pp. 813-820, Sep. 1997.

Tugnait, J.K., "FIR Inverses to MIMO Rational Transfer Functions with Applications to Blind Equalization," *IEEE Proc. 30th Asilomar Conf.*, Pacific Grove, CA, pp. 295-299, 1997.

Gantmacher, F. R., "The Theory of Matrices", vol. 1, *AMS Chelsea Publishing*, New York: Chelsea, 1959.

Liu, R., et al., A System Theoretic Foundation for Blind Separation of MIMO-FIR Convolution Mixtures—*IEEE Signal Processing Society Second International Workshop on Indpendent Component Analysis and Blind Signal Separation*, pp. 205-210, Helsinki, Finland, Jun. 19-22, 2000.

Ketchum, J.W., et al., "Adaptive Algorithm for Estimating and Suppressing Narrow-Band Interference in PN Spread-Spectrum Systems," *IEEE Trans. Communication*, vol. COM-30, No. 5, pp. 913-924, May 1982.

Milstein, L. B., et al., "An Analysis of a Real-Time Transform Domain Filtering Digital Communication System: Part I: Narrowband Interference Rejection," *IEEE Trans. on Communication*, COM-28,No. 6, pp. 816-824, Jun. 1980.

Saulnier, Gary J., et al., "Wavelets and Filter Banks in Spread Spectrum Systems," A. N. Akansu and M. J. T. Smith Eds. Subband and Wavelet Transforms: Design and Application, Kluwer, pp. 309-345, 1995.

Lee, J. S., et al., "Probability of Error Analyzes of a BFSK Frequency-Hopping System with Diversity Under Partial-Band Jamming Interference Part I: Performance of Square-Law Linear Combining Soft Decision Receiver," *IEEE Trans. Communication*, vol. COM-32, pp. 645-653, Jun. 1984.

Liu, Rueywen, et al., "Anti-Jamming filtering in the Autocorrelation Domain," *IEEE Signal Processing Letters*, vol. 11, No. 6, pp. 525-528.

Lee, Jhong Sam, "Overview of the Technical Basis of Qualcomm's CDMA Cellular Telephone System Design—A View of North American TIA/EIA IS-95," Singapore ICCS, pp. 353-358, 1994 IEEE.

Luo, H., et al., "Blind Equalization for MIMO FIR Channels Based Only On Second Order Statistics by Pre-Filters," *2nd IEEE Signal Processing Workshop on Signal Processing Advances in Wireless Communications* (SPAWC'99), May 9-12, 1999, Annapolis, MD., pp. 106-109.

Luo, H., et al., "Second-Order Statistics Blind MIMO-FIR Channel Equalization for Antenna Array-Base Wireless Communications Systems," *IEEE Sensor Array and Multichannel Signal Processing Workshop* (SAM 2000), pp. 286-290.

Hua, Y., et al., "Blind Identification of Colored Signals Distorted by FIR Channels," *Proceedings of IEEE ICASSP 2000*, Istanbul, Turkey, Jun. 2000, pp. 3124-3127.

Hua, Y., et al., "Blind Identifiability of FIR-MIMO System with Colored Input Using Second Order Statistics," *IEEE Signal Processing Letter*, vol. 7, No. 12, Dec. 2000, pp. 348-350.

Hua, Ynigbo, "Blind Identification and Equalization of Channels Driven by Colored Signals," *Signal Processing Advances in Wireless Communications*, vol. 1, Chapter 4, pp. 113-137, 2001, Prentice Hall.

Liu, R., et al., "Limitations and Applicability of SOS-Based Blind Techniques for Channel Equalization," Proc. ECCTD, Espoo, Finland, Aug. 2001, 5 pages total.

Liu, R., et al., "Multi-User Blind Channel Equalization and Signal Discrimination by NIA Matched Filters," *Proc. IEEE CAS/Notre Dame Workshop on Wireless Communications and Networking*, University of Notre Dame, Notre Dame, IN., Aug. 2001, pp. 274-277.

Song, L., et al., "A Novel Semi-Blind DS/CDMA Scheme," *Proc. IEEE CAS/Notre Dame Workshop on Wireless Communications and Networking*, University of Notre Dame, Notre Dame, IN., Aug. 2001, pp. 335-338.

Luo, Hui, et al., "The Autocorrelation Matching Method for Distributed MIMO Communication Over Unknown FIR Channels," Proc. ICASSP, Salt Lake City, UT. vol. 4, 2001, pp. 2161-2164.

Luo, H., et al., "Apply Autocorrelation Matching Method to Outdoor Wireless LAN on Co-Channel Interference Suppression and Channel Equalization," *Proc. IEEE Wireless Communications & Networking Conference* (WCNC), Orlando, FL., Mar. 2002, pp. 459-464.

Liu, R., et al., "Autocorrelation-A New Differntiation Domain for Multiple Access Wireless Communication," Proc. ISCAS, vol. III, Phoenix, AZ., May 2002, pp. III-643-III-646.

Luo, Hui., et al., "A Closed-Form Solution to the Autocorrelation Matching Method for Wireless MIMO Communications," IEEE Workshop on Multimedia Signal Processing, Dec. 2002, pp. 392-395.

Hong, Lan, et al., "A Novel Algorithm for Blind Channel Identification Based on Modified Principle of Autocorrelation Matching," *Proc. TENCON'02, 2002 IEEE Region 10 Conference on Computers, Communications, Control and Power Engineering*, vol. 2, Oct. 2002, pp. 968-971.

Song, L., et al., "A New Multiplex-Access Scheme Based on the Diversity of Autocorrelation," vol. 1, *IEEE Proc. ICC*, 2003, pp. 720-724.

Luo, H., et al., "A Closed-Form Solutions to Blind MIMO FIR Channel Equalization for Wireless Communication Systems Based on Autocorrelation Matching," *Proc. ICASSP*, vol. 4, Apr. 2003, pp. IV-293-IV-296.

Ying, Rendong, et al., "Decision Feedback for Autocorrelation Matching Anti-Jamming Filter," *Proc. Frontiers of Mobile and Wireless Communication*, vol. 1, 2004, pp. 33-36.

\* cited by examiner

METHOD AND SYSTEM FOR WIRELESS COMMUNICATIONS USING ANTI-INTERFERENCE TO INCREASE DATA TRANSMISSION RATE

RELATED APPLICATION

This application claims the priority of U.S. Provisional Application 60/526,512 filed Dec. 3, 2003.

FIELD OF THE INVENTION

This invention relates generally to wireless communications, and more particularly to a method and system that blocks interferences/jamming and/or conditions the channel to achieve improved transmission channel capacity.

BACKGROUND

Wireless communications have become a major way of communications and in many applications are replacing conventional land-based communication systems. There are many kinds of wireless communication systems, such as the cellular phone system, the wireless LAN, and the WiFi as shown in FIG. 1. The most commonly used system is the cellular system, and the other wireless communication systems are growing rapidly.

One common problem frequently encountered in wireless communications is the presence of interfering signals transmitted by devices other than the particular sender with which the receiver wants to communicate. Depending on the types of the wireless communications, the interferences may be intentional, such as the jamming of military wireless transmissions, or accidental and resulting from having multiple users who are sharing a common wireless channel with or without base station. Interferences are found in various common wireless communication systems, and the users of a wireless channel may be, for instance, a cellular phone, a laptop computer, etc.

The presence of interfering signals can severely compromise the ability of the receiver to discern the signal from the intended sender, resulting in a significant reduction of the effectively channel capacity for the wireless transmissions from the sender to the receiver. In the cellular system, multi-user technologies have been used to combat the inter-user interference by a base station. The three commonly used multi-user technologies are the Frequency Division Multiple Access technology (FDMA), the Time Division Multiple Access technology (TDMA), and the Code Division Multiple Access technology (CDMA). In FDMA, the users are assigned non-overlapping frequency slots (by the base station), and hence the inter-user interference can be avoided. Similarly, in TDMA the users are assigned non-overlapping time-slots, and in CDMA users are assigned non-overlapping orthogonal codes. Because the power limitation of the base station, the area of the cell it controls is limited to its neighborhood. Therefore, any user outside the cell can not be controlled by this base station, and hence may interfere with the users in the cell.

Interferences in wireless transmissions are also a serious issue for Wireless Local Area Network (LAN). A wireless LAN uses part of the frequent spectrum that is free to everybody and hence it costs nothing to use the spectrum. It uses the internet to reach the outside world and hence it again costs nothing. However, the interferences between the users can be significant because this part of spectrum is unregulated. This is one of the major challenges for wireless LAN. The current technology confines it to be in a local area with limited users. It does not allow it to be developed to reach its full commercial potential value. WiFi is one kind of Wireless LAN and hence shares the same advantages and challenges. Interferences between the users also exist in ad hoc network, a closed wireless communication network but without a central commend.

In view of the foregoing, there is a significant need for a way to effectively counter the negative effects of interfering signals and to enhance the channel capacity of wireless communications between a sender and a receiver in the presence of interfering signals.

BRIEF SUMMARY OF THE INVENTION

The present invention provides a method and system for wireless communications that effectively blocks interferences regardless of their distribution, thereby allowing the channel capacity to be significantly improved. In accordance with the invention, the receiver receives a plurality of input signals by using, for example, two or more receiving devices (e.g., antennas or smart antennas). Each input signal contains a signal component corresponding to wireless transmissions from an intended sender, and an interference component corresponding to wireless transmissions from at least one interference source. The multiple input signals are then used to derive a filtering vector for filtering out the interference signal to extract the signal from the intended sender. This is done by selecting the filtering vector to be substantially orthogonal to the interfering vector. Since the direction of the interfering vector is not known to the receiver, such problem is non-trivial. In accordance with a feature of the invention, this problem is effectively solved by performing a noise-transparent autocorrelation matching analysis that allows the receiver to compute the orthogonal filtering vector without the need for the information about the interfering vector. Because the information used for this method is noise-transparent, the filter obtained is of a high degree of accuracy.

Another feature of the invention provides a method and system for wireless communications that improves the channel capacity, by conditioning the channel by the sending device and/or by the receiving devices, up to the optimal capacity. The position of the signal vector theoretically achieves the optimal capacity when it is orthogonal to all inferring vectors. In other words, the optimal signal vector is parallel to the optimal anti-interference filtering vector and may differ from the latter by a scaling factor. The objective of the conditioning the channel is to manipulate the signal vector to the position of the filtering vector such that it is substantially orthogonal to some, and if possible, all, of the interfering vectors. To that end, the information derived by the receiver may be fed back either to the receiving devices of the receiver and/or to the sending device of the sender for the purpose of conditioning the channel such that the signal vector is substantially parallel to the filtering vector derived from the noise-transparent autocorrelation analysis. This may be done, for example, by adjusting the weights of their respective smart antennas. With this feedback approach, it is possible for the sender and the receiver to achieve an optimal capacity that is the maximal of all channel capacities taken among all distributions of the interferers and all the channel matrices. In other words, the wireless communications between the sender and the receiver may achieve an optimal capacity that exceeds the limits imposed by the well-known Shannon channel capacity of the original channel.

DETAILED DESCRIPTION OF PREFERRED EMBODIMENTS

Figure 1:
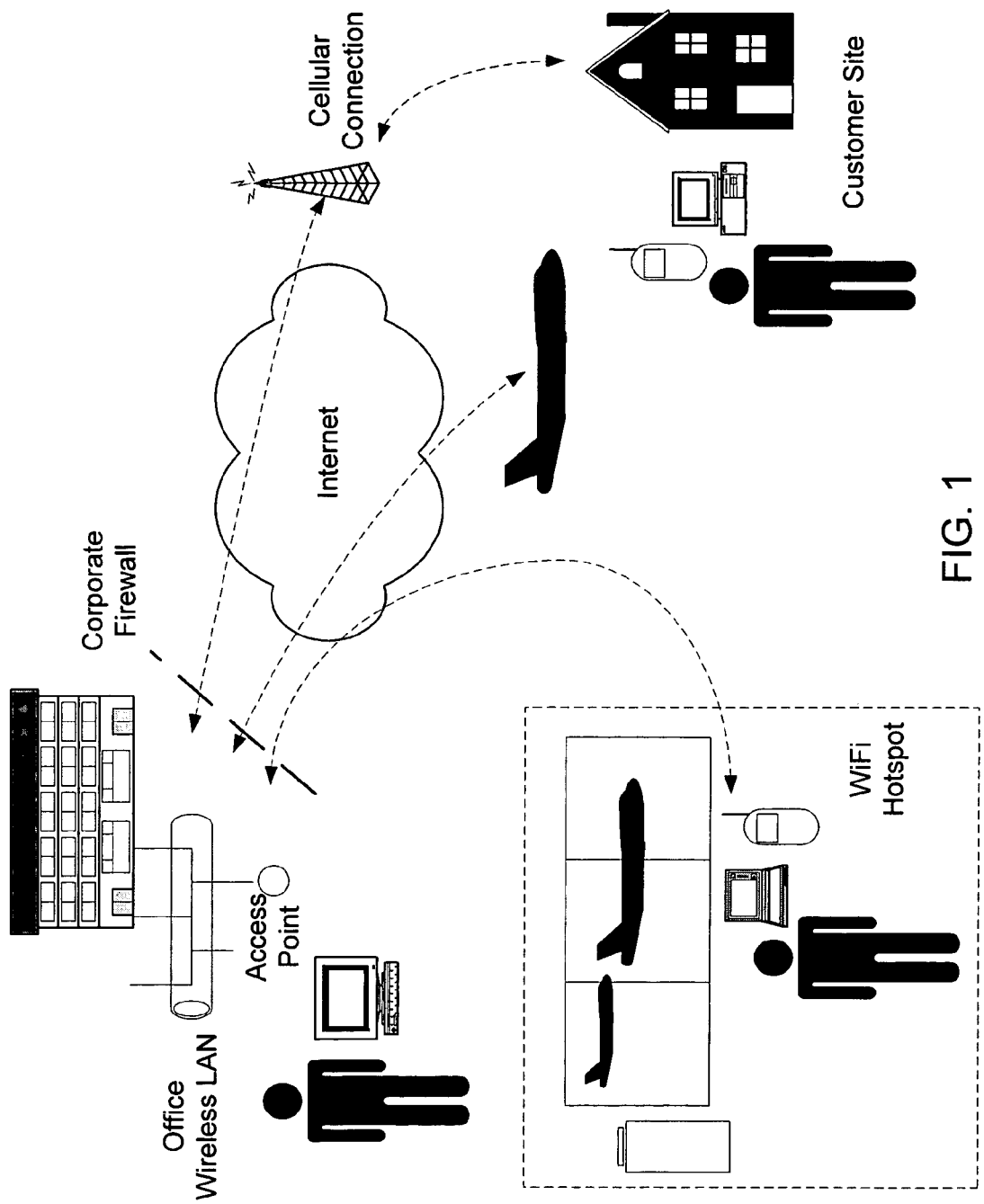
FIG. 1 is a schematic diagram illustrates several wireless communication systems in which the present invention may be implemented to effectively block interference signals and achieve an improved channel capacity.
Figure 2:
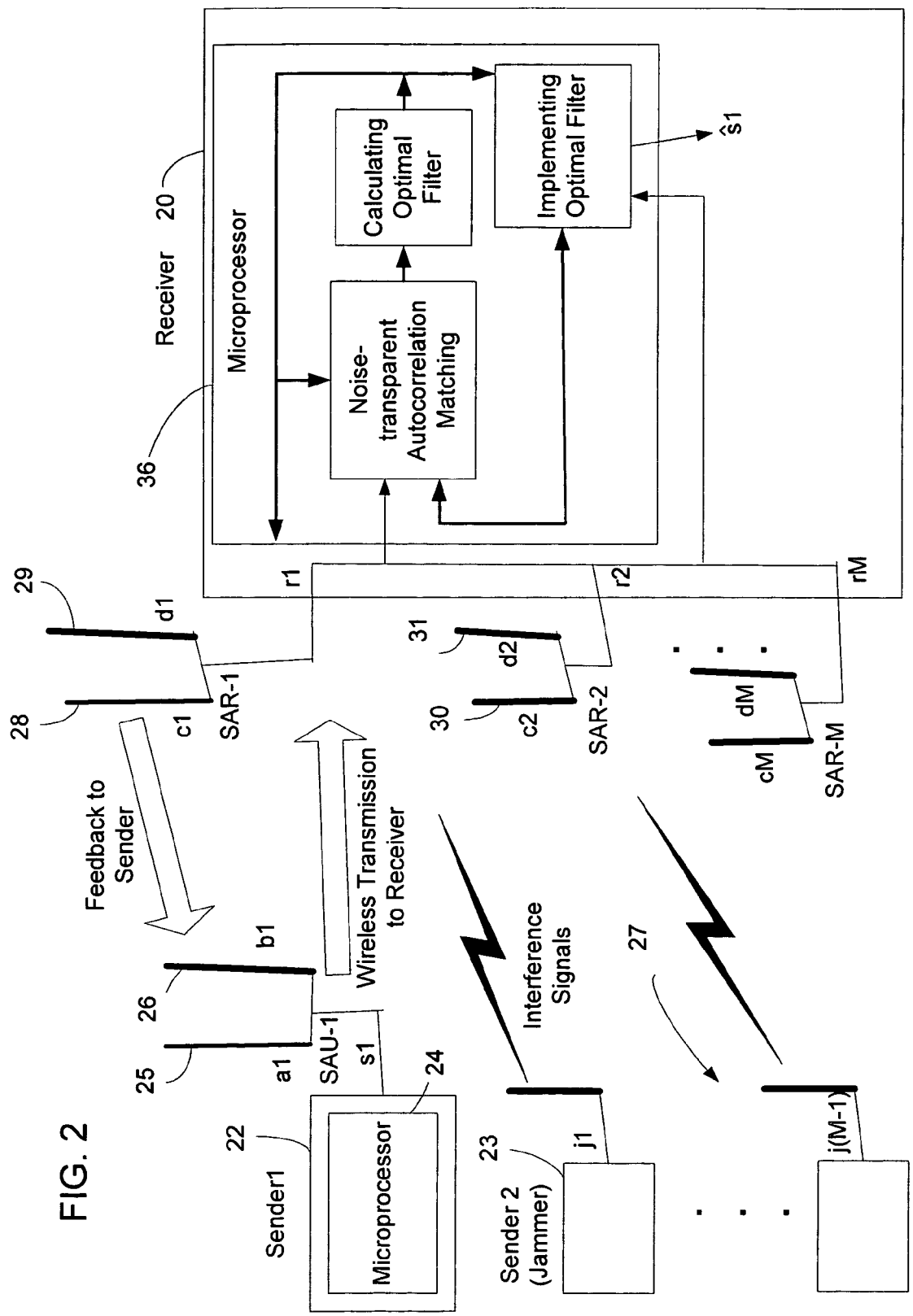
FIG. 2 is a schematic diagram showing an embodiment of the invention in which the channel capacity of wireless communications between a sender and a receiver is enhanced by blocking interference signals and/or conditioning the channel in accordance with the invention.

Referring to FIG. 2, the present invention provides a method and system to effectively block unwanted signals that interfere with the wireless communications between a sender and a receiver. As a result, a significant enhancement in the channel capacity for the wireless communications is achieved, and in a case using a feedback approach of the invention as described in detail below the channel capacity may exceed the limit set by the well-known Shannon channel capacity in the presence of interferences. As illustrated in the embodiment of FIG. 2, a first sender 22 sends a wireless signal s1 through a sending device that can be an antenna or a smart antenna unit SAU-1 as shown which includes two antennas 25 and 26 with adjustable weights a1 and b1 respectively. A second sender 23 sends another wireless signal j1 through its antenna. In this example, the first sender 22 is the intended sender that the receiver 20 wants to communicate with. Since the wireless signal j1 uses the same wireless communication channel used by the wireless signal s1, it will interfere with s1. In this context, the second sender 23 may be viewed as a "jammer." It should be noted that the interference or jamming may be intentional, as in the case of military communications, or unintentional as in the case of cellular phone transmissions or wireless LAN. Besides the first and second senders 22 and 23, there may be other senders 27, which may also be considered as interference sources or jammers due to their transmission of signals j2-j(M–1) that use the same wireless channel used by s1. The receiver 20 may be one of many different types of wireless communication devices, such as a cellular phone, a computing device for a wireless LAN, or a computing device for WiFi, a military wireless communication transceiver, etc.

In accordance with a feature of the invention, the receiver 20 has at least two receiving devices for providing at least two received wireless signals as inputs for processing by the microprocessor 36 of the receiver for anti-interference operations. In the embodiment of FIG. 2, the receiver 20 has two or more receiving devices each of which can be an antenna, or a smart antenna unit as shown. Each of the receiving devices provides a received wireless signal. It will be appreciated that although smart antennas are used in this embodiment they are not required for implementing the anti-interference approach of the invention. The smart antenna unit SAR-1 includes two antennas 28 and 29, with adjustable weights c1 and d1 respectively. Similarly, the smart antenna unit SAR-2 includes two antennas 30 and 31 with adjustable weights c2 and d2 respectively. As will be described in detail below, two received wireless signals allows the receiver 20 to generate an anti-interference filter in accordance with the invention to effectively block the interference signal from one jammer, such as the sender 23. The anti-interference method of the invention can be applied to handle a situation in which there are more than one sources of interference signals. To that end, if there are M–1 interference sources or jammers, M or more input signals will be required for the receiver 20 to generate an anti-interference filter for each of the interference sources. In the embodiment of FIG. 2, the receiver 20 has M smart antennas, which allow the receiver to block out interference signals j1-j(M–1). For clarity of description, the following description will focus on the operation of blocking the interference signal from the sender 23.

The signal s1 sent by the sender 22 is transmitted by a sending device of the sender, which in the embodiment shown in FIG. 2 is the smart antenna unit SAU-1. The transmitted signal and the interfering signal j1 are received by the receiving devices of the receiver, which are smart antennas SAR-1 and SAR-2 in the embodiment of FIG. 2. The outputs of SAR-1 and of SAR-2, denoted by r1 and r2 respectively, become the received signals to the receiver 20. These received signals ($r_1$, $r_2$) are used by the microprocessor 36 to set up the functional unit "Implementing Optimal Filter" by doing the following. These received signals ($r_1$, $r_2$) are first fed into the "Noise-Transparent Autocorrelation Matching" unit, which produces the coefficients of the anti-interference filter. These coefficients are then fed into the unit "Calculating Optimal Filter" which produces the coefficients of a filtering vector called the "optimal filter." This step from anti-interference filter to optimal filter is useful but not necessary. These coefficients are installed in the unit Implementing optimal filter. With this optimal filter, the interference j1 is blocked. In a "feedback" approach in accordance with the invention, the filtering vector, or the coefficients of the optimal filter, may be used to conditioning the channel by manipulating the signal vector to the filtering vector, by using the smart antennas of the receiving devices of the receiver. Alternatively, the optimal filter data are transmitted to the sender 22. This filtering vector is fed into the microprocessor 24 of the sender 22, which can then be used for the conditioning the channel by, for example, adjusting the weights a1 and b1 of the smart antenna SAU-1. This feedback approach is described in greater detail below. After such an adjustment, the channel capacity from the sending signal $s_1$ to the output signal $ŝ_1$ of the Microprocessor 36 in the Embodiment in FIG. 2 may be improved up to the optimal capacity and in the meantime all interferers can be blocked in this manner.

The Model and the Problem

Figure 3:
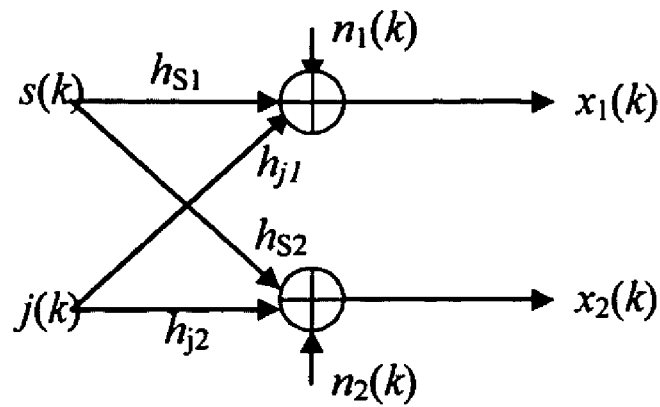
FIG. 3 is a diagram illustrating a channel model for wireless transmissions received by a receiver from a sender and a "jammer" that transmits an interference signal.

For simplicity, the channel, as shown in FIG. 3, involves the following: the signal s(k) to be transmitted to the channel; the two receivers $x_1(k)$ and $x_2(k)$; the two noises $n_1(k)$ and $n_2(k)$ which representing the imperfections of the receivers as well as the background noise associated with the location of the receiving antenna; and the interfering signal or the jamming j(k) to be transmitted to the channel possibly from an unknown location. The smart antennas that used for the transmission of the signal and the interferer and the smart antennas that used for the receiving the received signals are not shown in FIG. 3, but they are detailed in FIG. 2. The concept presented here can be easily be extended to the multiple-user and multiple-receiver case as shown in FIG. 2, though the details may be more involved.

Figure 4:
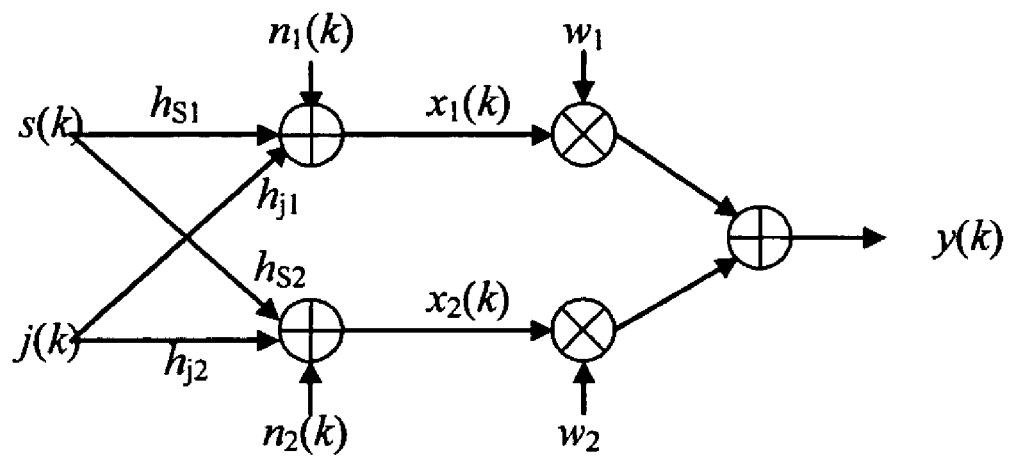
FIG. 4 is a diagram illustrating the use of an anti-interference filter to remove contributions of the interference signal.

When the signal transmitted from the sender s(k) to say antenna #1, degradation occurs and this degradation is denoted by $h_{s1}$. Similarly, for $h_{s2}$, $h_{j1}$, and $h_{j2}$ as shown in FIG. 3. The ultimate goal for a communication system is to recover the information sending by s from the received signals $x_1$ and $x_2$ to a degree that satisfies the requirement of a particular application. One way to fulfill the objective is to insert a linear filter $w=(w_1, w_2)$ cascaded with the channel as shown in FIG. 4. The purpose of the filter design is for the output y(k) to achieve a bit-error rate (BER) that satisfies a particular application.

The received signal is related with the signal, the jamming and the noise according to the equation, $$\begin{cases} x_1(k) = h_{s1}s(k) + h_{j1}j(k) + n_1(k) \\ x_2(k) = h_{s2}s(k) + h_{j2}j(k) + n_2(k) \end{cases} \quad (1)$$

The output of the filter $w=(w_1, w_2)$ is given by $$y(k)=w_1x_1(k)+w_2x_2(k) \quad (2)$$

The receiving vector, the signal vector, the interfering vector, the filtering vector and the noise vector, are denoted respectively as follows:

$$x = \begin{bmatrix} x_1 \\ x_2 \end{bmatrix}, \quad h_s \begin{bmatrix} h_{s1} \\ h_{s2} \end{bmatrix}, \quad h_j = \begin{bmatrix} h_{j1} \\ h_{j2} \end{bmatrix}, \quad w = \begin{bmatrix} w_1 \\ w_2 \end{bmatrix}, \quad \text{and} \quad n = \begin{bmatrix} n_1 \\ n_2 \end{bmatrix}$$

The composite equation is then given by $$y(k)=(w_1h_{s1}+w_2h_{s2})s(k)+(w_1h_{j1}+w_2h_{j2})j(k)+(w_1n_1(k)+w_2n_2(k)) \quad (3)$$

Let the filter $(w_1, w_2)$ satisfies the "anti-interference condition" as follows:

$$\begin{cases} w_1h_{j1} + w_2h_{j2} = 0 \\ w_1h_{s1} + w_2h_{s2} = 1 \end{cases} \quad (4)$$

With this filter, we have $$y(k)=s(k)+(w_1n_1(k)+w_2n_2(k)) \quad (5)$$

As shown in (5), the interference is completely blocked by the filtering action as shown by the first equation of (4). The second equation of (4) is not as important, as long as it is non-zero. The solution for the filter $(w_1, w_2)$ of Eq. (4) exists and is unique if and only if the channel matrix $$H = \begin{bmatrix} h_{s1} & h_{j1} \\ h_{s2} & h_{j2} \end{bmatrix} \quad (6)$$

is non-singular, which is a design criterion for multiple antenna systems.

The above description has demonstrated that the jamming cam be completely blocked by a filtering action, which is a unique feature for multiple (two or more) receivers. Currently, a single receiver is commonly used in wireless communication devices. The commonly used anti-jamming methods, such as frequency hopping and smart antennas, can reduce the jamming but not completely block it. In contrast, this invention provides an approach that can effectively block jamming or interference signals. The task is to generate an anti-interference filter that will substantially satisfy the first equation of Condition (4). In accordance of this invention, the anti-interference filter is derived by performing the noise-transparent autocorrelation matching method on the multiple input signals.

Part I. The Noise-Transparent Autocorrelation Matching Method

In accordance with a feature of the invention, the anti-interference filter can be obtained with a high degree of accuracy, without the knowledge of the channel matrix. This is achieved by performing a noise-transparent autocorrelation matching analysis. The method of noise-transparent autocorrelation matching allows one to find a desired filtering vector that, in theory, is orthogonal to all the interfering vectors and hence blocks all the interferences. According to a discovery of the invention, when the filtering vector is adjusted such that the autocorrelation of the output of the filter equals to that of the sending signal up to a scalar factor on a noise-transparent set of time lag values, the resulting filtering vector is the desired one. Thus, this method enables the receiver to generate a desired filter for blocking the interferences even when the interfering vectors are unknown. In this regard, any filtering vector that equals to a desired vector times a scalar factor is also a desired vector. Moreover, the algorithm that achieves the method as described below is not unique. There can be many of them, and the invention should not be viewed as being limited to any of them.

The anti-interference filter is calculated by using only the autocorrelation in the half interval $\tau \geq 1$. Denote $r_s(\tau)=\text{Ex}\{s(k)s(k-\tau)\}$ the autocorrelation of s, which is a function of the lag $\tau$. Similarly, for $r_y(\tau)$ and $r_j(\tau)$. For simplicity, assume that s(k), j(k), $n_1(k)$ and $n_2(k)$ are uncorrelated. Then, the autocorrelation of the output is given by, $$r_y(\tau)=(w_1h_{s1}+w_2h_{s2})^2 r_s(\tau)+(w_1h_{j1}+w_2h_{j2})^2 r_j(\tau)+(w_1^2+w_2^2)\sigma_n^2\delta(\tau) \quad (7)$$

where $\delta(\tau)$ is the Dirac delta function, and $\delta(\tau)=0$ when $\tau \geq 1$. Therefore, the above equation becomes, $$r_y(\tau)=(w_1h_{s1}+w_2h_{s2})^2 r_s(\tau)+(w_1h_{j1}+w_2h_{j2})^2 r_j(\tau), \text{ for } \tau \geq 1 \quad (8)$$

It is important to note that Eq. (8) is transparent to white noises.

Now, imposing the condition of "autocorrelation matching," i.e., setting the autocorrelation of the output to be equal to that of the signal on a noise-transparent set S, i.e., $$r_y(\tau)=r_s(\tau) \text{ for } \tau \in S \tag{9}$$

where $S=\{1 \leq \tau_1 < \tau_2 < \ldots < \tau_M\}$, Eq. (8) becomes, $$\begin{bmatrix} r_y(\tau_1) \\ r_y(\tau_2) \\ \vdots \\ r_y(\tau_M) \end{bmatrix} = \begin{bmatrix} r_s(\tau_1) \\ r_s(\tau_2) \\ \vdots \\ r_s(\tau_M) \end{bmatrix} \tag{10}$$

$$= (w_1 h_{s1} + w_2 h_{s2})^2 \begin{bmatrix} r_s(\tau_1) \\ r_s(\tau_2) \\ \vdots \\ r_s(\tau_M) \end{bmatrix} +$$

$$(w_1 h_{j1} + w_2 h_{j2})^2 \begin{bmatrix} r_j(\tau_1) \\ r_j(\tau_2) \\ \vdots \\ r_j(\tau_M) \end{bmatrix}$$

Suppose that the two column-vectors in the right side are linearly independent, which are usually the case if M is choosing large enough. Then, one obtains $$\begin{cases} w_1 h_{j1} + w_2 h_{j2} = 0 \\ w_1 h_{s1} + w_2 h_{s2} = \pm 1 \end{cases} \tag{11}$$

The first equation of (11) states that the filtering vector that satisfies the autocorrelation matching condition (9) on the noise-transparent set S is orthogonal to the interfering vector. Hence, in reality, the anti-inference filter generated by the noise-transparent autocorrelation matching method should be substantially orthogonal to the interfering vector. As such, the interference is substantially blocked by the anti-interference vector. As a feature of this invention, the Noise-Transparent Autocorrelation Matching method states that the anti-interference filter is obtained when the filtering vector is adjusted so that the autocorrelation of the output of the filter matches that of the sending signal on a noise-transparent set.

In order to show that the anti-interference filter can be obtained computationally, a description of an algorithm is given here. The noise-invariant autocorrelation matching condition (9) is equivalent to $$w^T R(\tau) w = r_s(\tau) \text{ for } \tau \in S \tag{12}$$

where $R(\tau) = E_x\{x(k) x^T(k-\tau)\}$ is the covariance matrix of the received signal x. For each $\tau \in S$, it can be computed from the received data set $(x_1(k), x_2(k))$ by the following formula, $$R(\tau) = \frac{1}{N} \sum_{k=1}^{N} \begin{bmatrix} x_1(k)x_1(k-\tau) & x_1(k)x_2(k-\tau) \\ x_2(k)x_1(k-\tau) & x_2(k)x_2(k-\tau) \end{bmatrix} \tag{13}$$

where N is the data length. Eq. (12) is a set of simultaneous quadratic equations of the form, $$a_s(m) = a_{11}(m) w_1^2 + a_{12}(m) w_1 w_2 + a_{22}(m) w_2^2, \text{ for } m=1, 2, \ldots M \tag{14}$$

An objective function can be used to find the solution, $$g(w_1, w_2) = \sum_{m=1}^{M} |a_{11}(m)w_1^2 + a_{12}(m)w_1 w_2 + a_{22}(m)w_2^2 - a_s(m)|^2 \tag{15}$$

The minimal point can be found from a derivative of Eq. (15) to give $$\begin{cases} \dfrac{\partial g}{\partial w_1} = p_1 w_1^3 + p_2 w_1^2 w_2 + p_3 w_1 w_2^2 + p_4 w_2^3 + p_5 w_1 + p_6 w_2 = 0 \\ \dfrac{\partial g}{\partial w_2} = q_1 w_1^3 + q_2 w_1^2 w_2 + q_3 w_1 w_2^2 + q_4 w_2^3 + q_5 w_1 + q_6 w_2 = 0 \end{cases}$$

Let $w_2 = \beta \cdot w_1$. Then, the above equation becomes $$\begin{cases} w_1 \cdot [w_1^2(p_1 + p_2 \beta + p_3 \beta^2 + p_4 \beta^3) + (p_5 + p_6 \beta)] = 0 \\ w_1 \cdot [w_1^2(q_1 + q_2 \beta + q_3 \beta^2 + q_4 \beta^3) + (q_5 + q_6 \beta)] = 0 \end{cases}$$

Note first that $w_1 = 0$ can not be a solution of (12). Canceling $w_1$ and eliminating $w_1^2$ from the remaining equations, one obtains $$(p_1 + p_2 \beta + p_3 \beta^2 + p_4 \beta^3) \cdot (q_5 + q_6 \beta) = (p_5 + p_6 \beta) \cdot (q_1 + q_2 \beta + q_3 \beta^2 + q_4 \beta^3)$$

which can be rearranged into a polynomial form of degree 4, $$f_4 \beta^4 + f_3 \beta^3 + f_2 \beta^2 + f_1 \beta + f_0 = 0 \tag{16}$$

Figure 5:
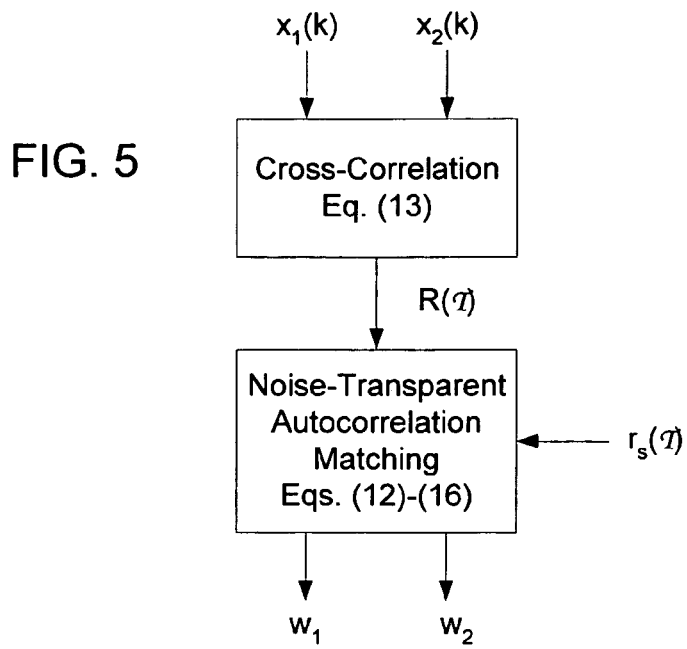
FIG. 5 is a flow chart illustrating a process for generating the anti-interference filter.

Hence, a closed form solution for $\beta$ can be found, from which the solution $[w_1 \ w_2]^T$ can be obtained. Note that Eq. (16) has four solutions from which a correct one can be obtained by substituting them into the objective function (15) and then choosing the minimal one. The data flow chart for the computation of the anti-interference filter is given in FIG. 5.

Simulation:

The purpose of the simulation is to show (I) that the anti-interference filter can be obtained with a high degree of accuracy comparing with the ideal one, and (II) the anti-interference filter substantially blocks the interference, over a wide range of noise and interference. In the simulation, the signal to noise ration (SNR) is ranged from 0 to 10 dB. The power of interference is ranged for 1-times, 3-times, and up to 9-times to the power of the signal.

In this simulation, the channel matrix is chosen as $$H = \begin{bmatrix} h_{s1} & h_{j1} \\ h_{s2} & h_{j2} \end{bmatrix} = \begin{bmatrix} 1 & 1 \\ -1 & 1 \end{bmatrix}. \tag{17}$$

The covariance matrix $R(\tau)$ is first computed by Eq. (13) from the received data $x(k) = (x_1(k), x_2(k))$ for the values of $\tau \in \{1, 2, 3\}$. The anti-interference filter $w_0 = (w_1, w_2)$ is then computed by following Eqs. (12)-(16). With this filter and the channel coefficients given in (17), one computes $b_1$ and $b_2$ defined below, $$\begin{cases} b_1 = w_1 h_{j1} + w_2 h_{j2} (=0) \\ b_2 = w_1 h_{s1} + w_2 h_{s2} (=\pm 1) \end{cases}$$

and then computes the Anti-interference Index (AJI), $$AJI = \frac{b_2^2}{b_2^2 + b_1^2} (\leq 1) \tag{18}$$

This index is one if and only if the anti-interference filter is ideally orthogonal to the interfering vector.

Figure 6:
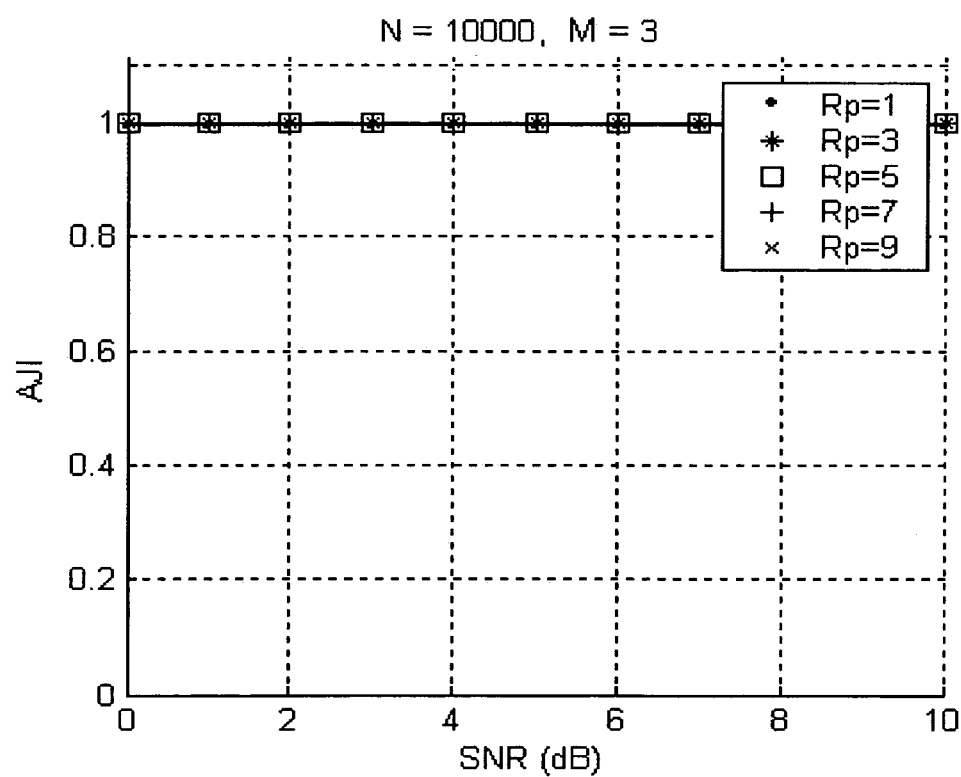
FIG. 6 is a plot showing values of an anti-interference index calculated in a simulation in which an anti-interference filter is used to block an interference signal in accordance with the invention.
Figure 7:
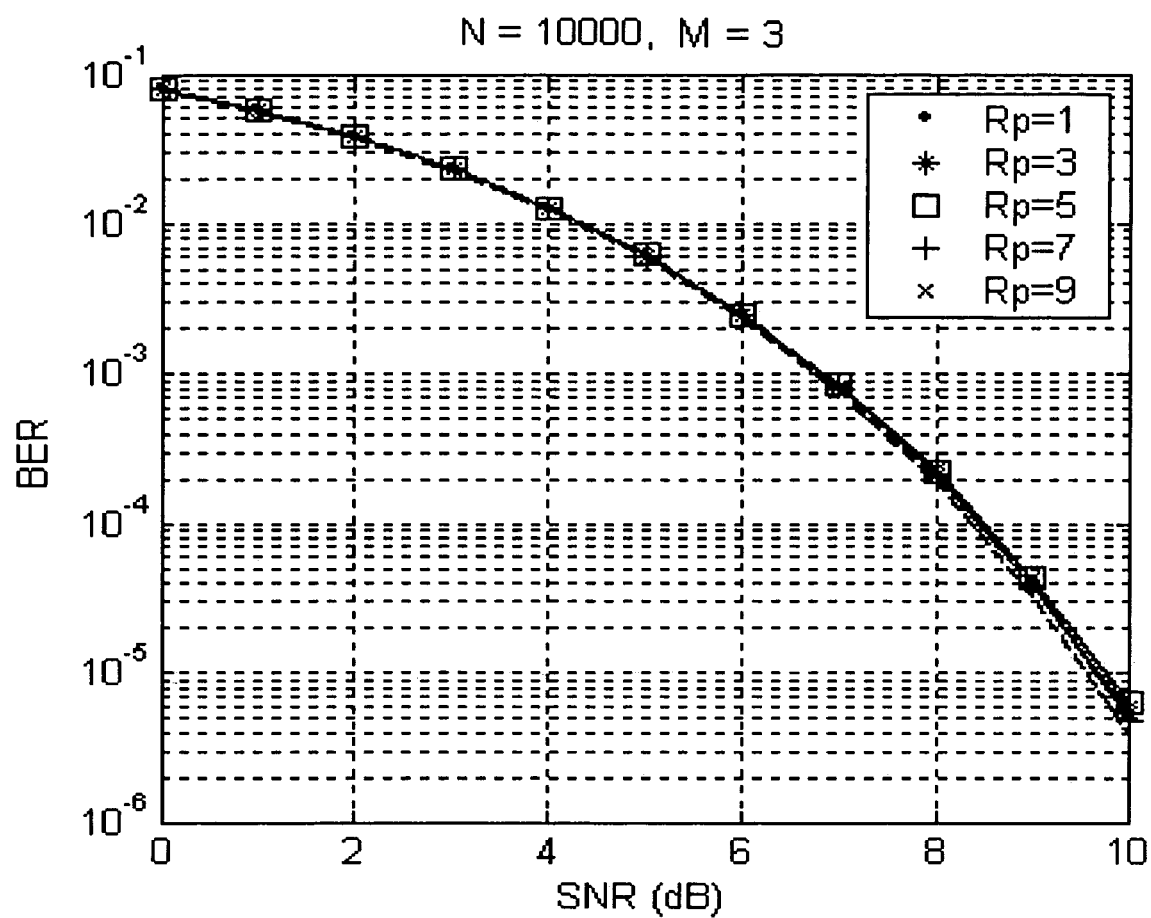
FIG. 7 is plot of bit error rates calculated in a simulation in which an anti-interference filer is used to block an interference signal in accordance with the invention.

The AJI-plots are shown in FIG. 6. The data length is N=10,000. As expected, they are bunched together around one; specifically, $1 \geq AJI \geq 0.994$. Hence the accuracy for the anti-interference filter is more than 99.4% over a wide range of interference and noise. The BER-plots are given in FIG. 7. The case for zero interference power is also plotted as a reference as shown by the dashed line. Again, all the plots are bunched together with the one with zero interfering power, showing that the interference is substantially blocked by the anti-interference filter. This shows that the anti-interference filter obtained by the method of the invention is of a high degree of accuracy and can substantially block the inferences over a wide range of interference and noises.

Part II. The Design of Optimal Anti-Interference System

For a given distribution of interference and for a given channel, the Shannon capacity is given by, $$C(j, H) = \underset{p(s)}{\text{Max}}\ I(s; x_1, x_2) \tag{19}$$

The optimal capacity is defined by, $$C^0 = \underset{p(j),H}{\text{Max}}\ C(j, H) = \underset{p(s),p(j),H}{\text{Max}}\ I(s; x_1, x_2) \tag{20}$$

It is the maximal of all Shannon capacities taken over all the interference distributions and all the channel matrices. The optimal capacity usually exceeds the Shannon capacity for a particular interference and for a particular channel. It can be shown that the optimal capacity is given by $$C^0 = \frac{1}{2} \log\left(1 + \frac{\sigma_s^2}{\sigma_n^2}\right) \tag{21}$$

which is also the capacity with zero interference. As a feature of the invention, it is theoretically shown that the optimal capacity is attained when the signal vector is orthogonal to all the interfering vectors. Based on this feature, the Optimal Anti-Interference (OAI) System will be presented to show that it substantially attains the optimal capacity and at the same time substantially blocks the interference.

The anti-interference filter $w_0 = (w_1, w_2)$ is first obtained by the noise-transparent autocorrelation matching method as shown in Part I. The OAI system is then set up by doing the following: first choose the optimal filter $w^0 = (w_1^0, w_2^0)$ as the normalized $w_0$, i.e., $$\begin{cases} w_1^o = \dfrac{w_1}{\sqrt{w_1^2 + w_2^2}} \\ w_2^o = \dfrac{w_2}{\sqrt{w_1^2 + w_2^2}} \end{cases} \tag{22}$$

and then condition the original signal vector to the optimal channel vector shown below $$\begin{cases} h_{s1}^o = w_1^o \\ h_{s2}^o = w_2^o \end{cases} \tag{23}$$

As such, the composite equation (3) of the conditioned channel becomes, $$y(k) = (w_1^0 h_{s1}^0 + w_2^0 h_{s2}^0)s(k) + (w_1^0 h_{j1} + w_2^0 h_{j2})j(k) + (w_1^0 n_1(k) + w_2^0 n_2(k)) \tag{24}$$

It is easy to show that $$w_1^0 h_{s1}^0 + w_2^0 h_{s2}^0 = (w_1^0)^2 + (w_2^0)^2 = 1 \tag{25}$$

and that $$w_1^o h_{j1} + w_2^o j_{j2} = \frac{1}{\sqrt{w_1^2 + w_2^2}}(w_1 h_{j1} + w_2 h_{j2}) = 0 \tag{26}$$

Then, Eq. (24) becomes $$y(k) = s(k) + v(k) \tag{27}$$

where $$v(k) = w_1^0 n_1(k) + w_2^0 n_2(k) \tag{28}$$

is the equivalent noise, which is Gaussian and its variance is $$\sigma_v^2 = \sigma_n^2((w_1^0)^2 + (w_2^0)^2) = \sigma_n^2 \tag{29}$$

The capacity of the optimal system (27) can be shown to be theoretically the same as the optimal capacity. Also, the interference is completely blocked as shown theoretically by (26). Therefore, as part of the invention, the OAJ-system is obtained by setting the optimal-filter and conditioning the channel vector to the optimal channel vector according Eq. (22) and (23). The OAI-system substantially attains the optimal capacity and substantially blocks the interference.

It will be appreciated that although the ultimate theoretical goal of the invention is to find an optimal set of parameters that allows complete blocking of all interference signals, the scope of the invention is not limited to actually obtaining such a theoretical optimal anti-interference system in real applications. As a practical matter, it may be very difficult or nearly impossible in a real application under real-world conditions and technical limitations to generate an anti-interference filtering vector that is exactly orthogonal to all interference vectors. Also, it may be difficult or nearly impossible to control the transmission or reception conditions to achieve exactly the optimal signal vector as derived above that is orthogonal to the interference vectors of all interference signals. Nevertheless, in real-world applications, the method of the invention allows the generation of an anti-interference filtering vector that is substantially orthogonal to the interference vectors of some interferences so that those interference signals can be effectively filtered out even if their interference vectors are unknown. Also, using the method of the invention, the transmission/reception of the communication channel may be conditioned such that the signal vector is substantially orthogonal to the interference vectors of some, perhaps not all, interference signals that are present. Such a signal vector may still significantly enhance the channel capacity, regardless of whether the optimal channel capacity is reached. The invention is intended to cover such real-world applications of the method of the invention, rather than the complete blocking of interference signals that is theoretically achievable with the invention.

Figure 8:
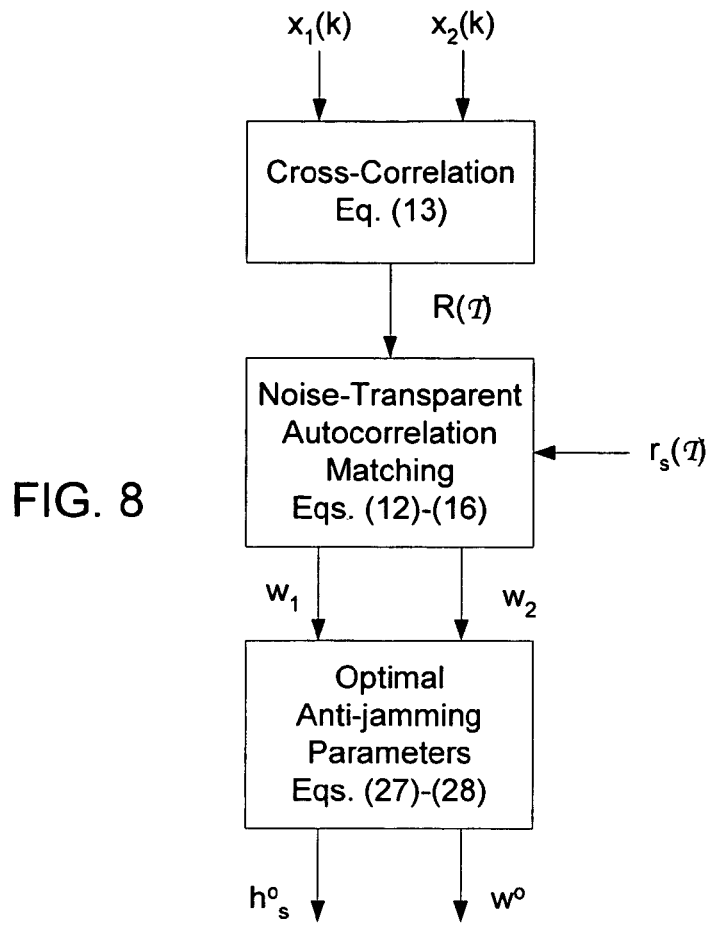
FIG. 8 is flow chart illustrating a method of computing optimal channel parameters for wireless communications between a sender and a receiver in the presence of an interference signal.
Figure 9:
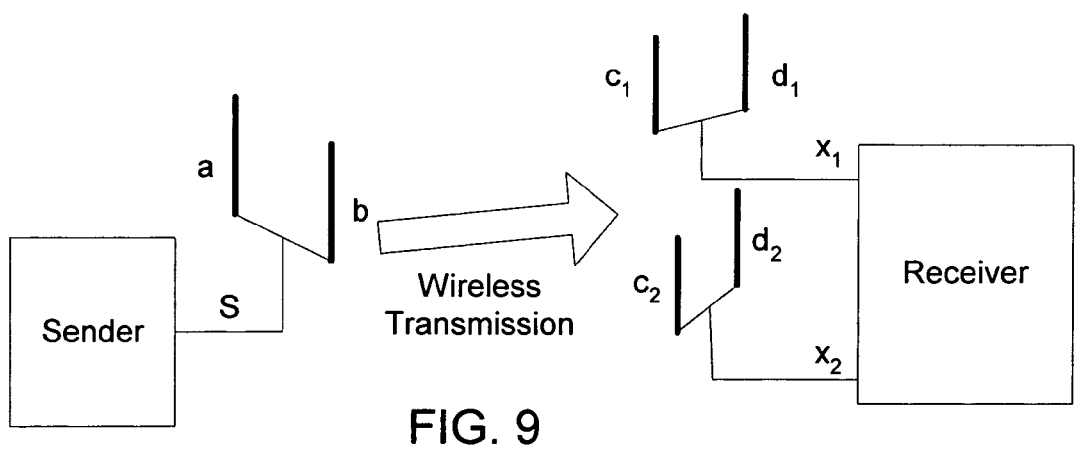
FIG. 9 is a schematic diagram illustrating an embodiment of wireless communications between a sender and a receiver in which the channel condition is adjusted in accordance with computed optimal channel parameters to enhance the channel capacity.
Figure 10:
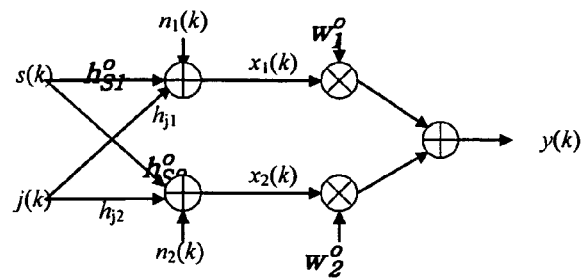
FIG. 10 is a channel model for an optimal anti-interference system in accordance with an embodiment of the invention.

The data flow chart for the computation of the optimal parameters is given in FIG. 8. Note in the step corresponding to Equation (23) that it requires a feedback of the information $(h_{s1}{}^0, h_{s2}{}^0)$ either to the receiving devices of the receiver 20 or to the transmitter of the sender 22 to change the channel vector from the original channel $(h_{s1}, h_{s2})$ to the conditioned one $(h_{s1}{}^0, h_{s2}{}^0)$. This can be done by use of Smart Antenna as suggested in FIG. 2. One such implementation will be illustrated here. Consider the case for one sending device and two receiving devices with smart antennas as shown in FIG. 9. The relation between the receivers and the sender is given by $$\begin{cases} x_1 = [\begin{array}{cc} c_1 & d_1 \end{array}] \begin{bmatrix} h_{11} & h_{12} \\ h_{21} & h_{22} \end{bmatrix} \begin{bmatrix} a \\ b \end{bmatrix} s = h_{s1}^o s \\ x_2 = [\begin{array}{cc} c_2 & d_2 \end{array}] \begin{bmatrix} h_{31} & h_{32} \\ h_{41} & h_{42} \end{bmatrix} \begin{bmatrix} a \\ b \end{bmatrix} s = h_{s2}^o s \end{cases} \quad (30)$$

where the coefficients $h_{ij}$ in the matrix are characteristics of the channel and can not be changed. However, $c_i$'s and $d_i$'s are the weights of the smart antennas in the receiving devices which can be adjusted from the receiver side; and a and b are the weights of the smart antenna at the sending device and can be adjusted from the transmitter side. It is easy to see that the coefficients $(h_{s1}, h_{s2})$ can be reached either by adjusting the weights of the smart antennas at the receiving devices, or by adjusting the weights of the smart antenna at the transmitting side. Therefore, Condition (23) can be achieved by smart antennas as suggested in FIG. 2.

In the simulation below, it will shown that the OAJ system substantially attains the optimal capacity and substantially blocks the interference.

Simulation

In the simulations, the channel is set up so that the angle between the signal and interference is 30°. The power of the signal is set to unity, the powers of the noises are to be in the range from 0 to 20 db, and the powers of the interference are to be 10-times and 100-times that of the signal. The binary code for the signal is used, i.e., s(k)={+1, −1}. The output is then decoded by the rule, $$y(k) = \begin{cases} +1, & \text{if } y(k) > 0 \\ -1, & \text{if } y(k) < 0 \end{cases}$$

By comparing the y(k) with s(k), errors can be measured. The bit error rate is given in FIG. 11. The data length is 10,000 and Monte-Carlo simulation is run for 100 times.

Figure 11:
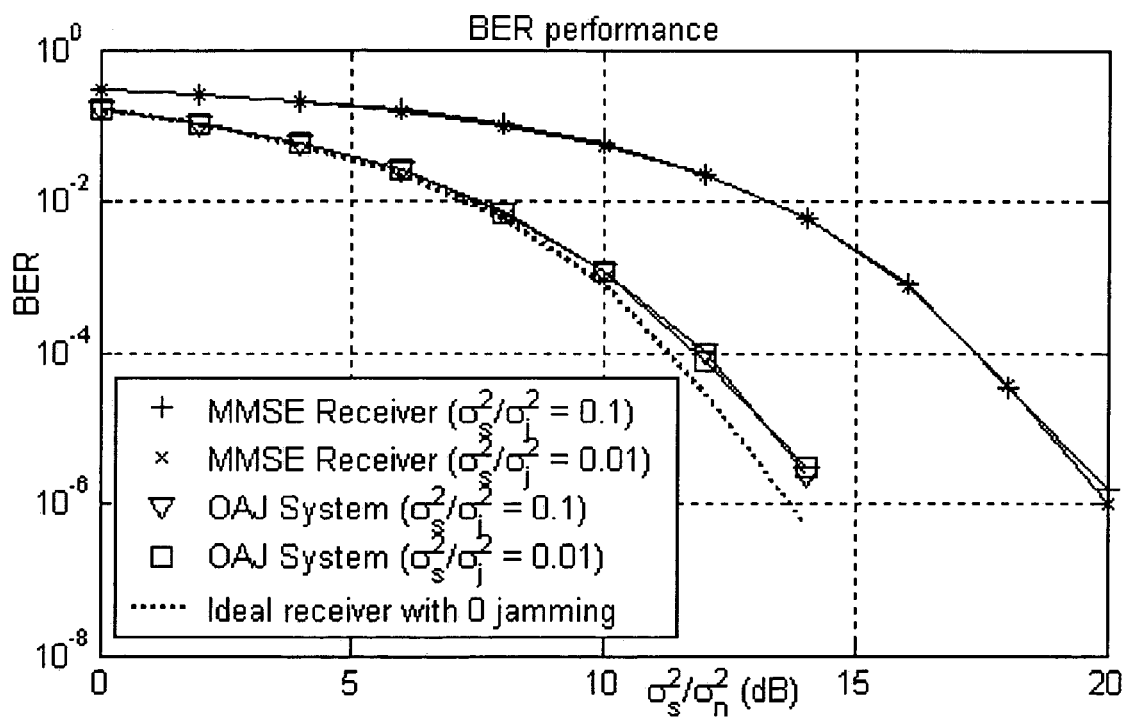
FIG. 11 is a plot of bit error rates for the optimal anti-interference system calculated in a simulation.

FIG. 11 provides a comparison of BER performances of the OAJ System with the original channel. As a reference for the optimal capacity, the BER curve for the actual channel with zero-interference is plotted by the dashed curve. The BER curves for the OAJ system with interference powers of 10 times and 100 times over the signal power are plotted, as marked by OAJ systems. It shows that these three plots are almost identical; implying that the channel capacity of the OAJ system attains the optimal capacity and the interference is completely blocked as predicted. The BER-plots for the original channel are marked by MMSE receiver. Comparing these BER curves, clearly shows that the channel capacity of the conditioned OAJ system is much better than the channel capacity of the original system.

It will be appreciated that an improved system and method for wireless communications with an interference-blocking feature and a significantly improved channel capacity have been described. In view of the many possible embodiments to which the principles of this invention may be applied, it should be recognized that the embodiments described herein with respect to the drawing figures are meant to be illustrative only and should not be taken as limiting the scope of invention. For example, even though the embodiment of FIG. 2 uses smart antennas, regular antennas may be used by the receiver to obtain the multiple received signals needed for calculating the anti-interference filter. Therefore, the invention as described herein contemplates all such embodiments as may come within the scope of the following claims and equivalents thereof.

I claim:

1. A wireless communication device comprising:
   at least two receiving devices responsive to sending signals, each of the receiving devices generating an input signal to a filter, wherein each input signal contains a signal component corresponding to wireless transmissions from a sender and an interference component corresponding to at least one interference signal;
   a processor connected to receive and process the input signals, the processor deriving a filtering vector by performing a noise-transparent autocorrelation matching analysis on the input signals such that autocorrelation of an output signal of the filter equals autocorrelation of the sending signal on a noise-transparent set of time lag values, and applying the filtering vector on the input signals to remove the interference components from a combined signal formed by combining the input signals.

2. A method of anti-interference operation for wireless communications between a sender and a receiver, comprising:
   generating, at least two separate input signals to a filter in response to wireless transmissions from the sender, each input signal having a signal component corresponding to the wireless transmissions from the sender and an interference component corresponding to at least one interference signal;
   performing a noise-transparent autocorrelation matching analysis on the at least two input signals to derive a filtering vector such that autocorrelation of an output signal of the filter equals autocorrelation of the signal from the sender on a noise-transparent set of time lag values; and applying the filtering vector on the at least two separate input signals to remove the interference components from a combined signal formed by combining the input signals.

3. A method as in claim 2, further comprising:
adjusting reception of the wireless transmissions from the sender to modify a channel vector for the at least two input signals based on the filtering vector.

4. A method as in claim 2, further comprising:
transmitting the filtering vector to the sender; and
adjusting by the sender wireless transmission parameters to modify a channel vector for the at least two input signals based on the filtering vector.

5. A method as in claims 3 further comprising conditioning a channel vector for the at least two input signals to be substantially parallel to the filtering vector.

6. A communications method for blocking interference in a communications system, the method comprising
receiving a desired communications signal comprising a signal component and M interference components, where M is one or more and the interference components need not be known,
generating M+1 input signals from the communications signal,
deriving from the M+1 input signals a filtering vector for filtering out the M interference components from the communications signal by performing an auto-correlation matching analysis on a noise-transparent set of time lag values that does not require information about the interference signal and the interference channel vectors of the interference components; and
filtering out the M interference components from the communications signal.

7. The method of claim 6 further comprising adjusting reception of the communication signal from a sender to modify a channel vector of the M+1 input signals based on the filtering vector.

8. The method of claim 6 further comprising transmitting the filtering vector to a sender and adjusting parameters of the communications signal to modify a channel vector for the M+1 input signals based on the filtering vector.

9. The method of claim 7 further comprising conditioning a channel vector for the M+1 two input signals to be substantially parallel to the filtering vector.

10. The method of claim 7 wherein the desired communications signal is received by one or more smart antennas and adjusting the reception of the communications signal includes adjusting weights given to each of the smart antennas.

11. The method of claim 8 wherein the desired communications signal is sent by a smart antenna and adjusting the reception of the communications signal includes adjusting weights given to the smart antenna.

12. The wireless communications device of claim 1 wherein at least one of the at least two receiving devices is a smart antenna.

13. The wireless communications device of claim 12 wherein the smart antenna includes two or more antennas, each associated with adjustable weights such that the processor adjusts the weights to maximize the effectiveness of the filter in removing the interference component.

14. The wireless communications device of claim 13 wherein all of the at least two receiving devices are smart antennas.

15. The wireless communications device of claim 1 including a transmitting device for sending weights of a smart antenna that is transmitting the sending signal so as to optimize the filtering vector.

16. The method of claim 8 further comprising conditioning a channel vector for the M+1 two input signals to be substantially parallel to the filtering vector.

17. A method as in claim 4 further comprising conditioning a channel vector for the at least two input signals to be substantially parallel to the filtering vector.

* * * * *